United States Patent [19]

Weiss et al.

[11] 3,869,541

[45] Mar. 4, 1975

[54] METHOD FOR MANUFACTURING HYDRAZINE

[75] Inventors: Francis Weiss, Pierre-Benite;
Jean-Pierre Schirmann, Brignais;
Henri Mathais, Sainte-Foy-les Lyon,
all of France

[73] Assignee: Produits Chimiques Ugine Kuhlman, Paris, France

[22] Filed: Jan. 3, 1972

[21] Appl. No.: 215,173

[30]  Foreign Application Priority Data
Jan. 7, 1971  France .............................. 71.00299

[52] U.S. Cl. .............................. 423/407, 260/566 B
[51] Int. Cl. ............................................. C01b 21/16
[58] Field of Search ................. 423/407; 23/190; 260/566 B, 557

[56]  References Cited
UNITED STATES PATENTS

| | | | |
|---|---|---|---|
| 2,415,356 | 2/1947 | Kellog et al. | 260/567 R |
| 2,894,032 | 7/1959 | Rudner | 260/566 B |
| 3,189,411 | 6/1965 | Kohnen et al. | 423/407 |

OTHER PUBLICATIONS

Audrieth et al.: The Chemistry of Hydrazine, (1951), John Wiley & Sons, Inc., New York, N.Y., p. 52.

*Primary Examiner*—Abgar R. Vertiz
*Assistant Examiner*—Gary P. Straub
*Attorney, Agent, or Firm*—Pennie & Edmonds

[57]  ABSTRACT

Hydrazine hydrate and hydrazine salts are manufactured by reacting a ketone with ammonia, hydrogen peroxide and a nitrile to produce a ketazine and a carboxylic amide. The ketazine is then reacted with water, a strong acid or both to produce hydrazine hydrate, a hydrazine salt, or both.

41 Claims, No Drawings

METHOD FOR MANUFACTURING HYDRAZINE

BACKGROUND OF THE INVENTION

I. Field of the Invention

This invention relates to a method for the manufacture of hydrazine hydrate and hydrazine salts which comprises reacting a ketone $R_1$—CO—$R_2$ with ammonia and hydrogen peroxide in the presence of a nitrile $R_3$—CN to produce a Ketazine $R_1R_2$—C=N—N=C—$R_1R_2$ wherein $R_1$, $R_2$ and $R_3$ each have the same meaning as designated below, separating the ketazine from the reaction medium and reacting the ketazine with water and/or a strong acid to produce hydrazine hydrate and/or a hydrazine salt.

II. Description of the Prior Art

Hydrazine hydrate is at present obtained in processes whereby ammonia is oxidized by means of sodium hypochlorite in dilute aqueous solution (the Raschig process) or by means of chlorine in the gaseous phase in the presence of a ketone for forming a ketazine, an intermediate hydrazone or diaziridine. Some variations of these processes employ urea as a source for the generation of ammonia in situ. In addition to the substantial technical difficulties inherent in the aforesaid processes resulting from the extreme sensitivity of hydrazine to oxidation or from the highly corrosive nature of the reaction mediumm, these processes present a substantial economic disadvantage in that they produce large quantities of alkaline chlorides, of which the separation from hydrazine is very costly and the purification of the latter is very difficult.

SUMMARY OF THE INVENTION

A process for the manufacture of hydrazine hydrate and hydrazine salts has been discovered which comprises:

a. reacting
  i. a ketone of the formula $$R_1\text{—CO—}R_2 \qquad (I)$$

wherein the radicals $R_1$ and $R_2$ each is a straight or branched chain alkyl radical or cycloalkyl radical containing up to about 10 carbon atoms, an unsubstituted phenyl radical or a phenyl radical substituted with one or more radicals which are stable in the reaction medium or $R_1$ and $R_2$ together is a straight or branched chain alkylene radical containing from 3 to about 11 carbon atoms with ii. ammonia ($NH_3$),
  iii. hydrogen peroxide ($H_2O_2$), and
  iv. a nitrile of the formula $$R_3\text{ — CN} \qquad (II)$$

wherein the radical $R_3$ is an acyclic or cyclic radical containing less than 8 carbon atoms, an unsubstituted phenyl radical or a phenyl radical substituted with one or more radicals which are stable in the reaction medium to produce v. a ketazine of the formula, and

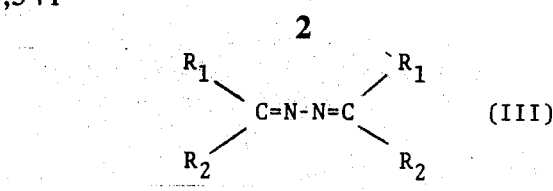

vi. a carboxylic amide of the formula;

$$R_3\text{—CO—}NH_2 \qquad (IV)$$

b. separating the ketazine (III) from the reaction medium; and
c. reacting the ketazine (III) with water and/or a strong acid to produce hydrazine hydrate and/or a hydrazine salt and regenerate the starting ketone (I).

The process of this invention avoids the disadvantages of the prior art processes which result from the use of chlorine or alkaline hypochlorites.

DETAILED DESCRIPTION OF THE INVENTION

Commonly assigned U.S. application Ser. No. 152,413, filed June 11, 1971 discloses a process for preparing ketazines of the formula

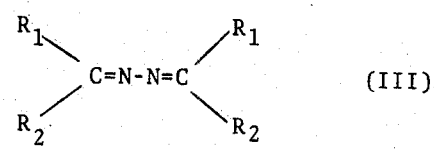

by the reaction of hydrogen peroxide with a ketone $$R_1\text{—CO—}R_2 \qquad (I)$$

in the presence of a nitrile, $$R_3\text{—CN} \qquad (II)$$

wherein $R_1$, $R_2$ and $R_3$ each have the same meaning as designated above.

It is now established that reactants (I), (II) and (III) react according to the following sequence;

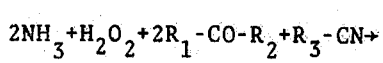 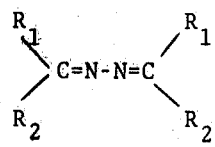 A

In addition to the ketazine resulting from this reaction, a quantity, usually minor, of derivatives of hydrazine and the starting ketone (I) are formed, of which diaziridines of the formula

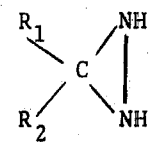

(V)

and hydrazones of the formula

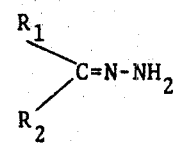

(VI)

have been identified.

One of the advantages of the processes according to this invention is that derivatives (V) and (VI) will react in the course of the process to yield the ketazine (III) or hydrazine. It is therefore to be understood that the term "ketazine" herein includes the ketazines of formula (III) as well as the derivatives thereof.

When $R_1$, $R_2$ or $R_3$ is a phenyl radical, said radical may be substituted with one or more radicals which are stable in the reaction medium, as for example, methyl, methoxy, chloro, bromo, fluoro and nitro radicals.

The ketazine resulting from the reaction of ketone (I), ammonia, hydrogen peroxide and nitrile (II) is advantageously recovered from the reaction medium by fractional distillation. Subsequent reaction of the ketazine fraction with water and/or a strong acid results in the production of hydrazine hydrate and/or a hydrazine salt corresponding to the acid employed and also results in the regeneration of the starting ketone (I). Advantageously, the regenerated ketone (I) is recycled for the preparation of ketazine (III). The carboxylic amide (IV) is advantageously treated to regenerate the nitrile (II) with said nitrile being recycled for the preparation of ketazine (III).

The reaction sequence whereby the ketazines (III) are prepared has been set forth above. The reaction sequences for the treatment of ketazines (III) with water and a strong acid HX, respectively may be illustrated as follows:

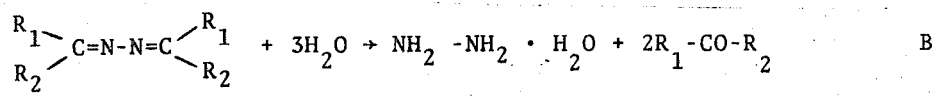    B

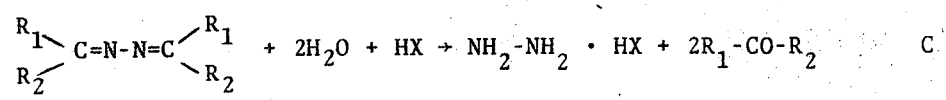    C

The acid HX is selected from amongst aqueous solutions of the strong acids, for example, hydrochloric, sulfuric and phosphoric acid.

The carboxylic amide (IV) resulting from reaction B or C can be decomposed to yield the starting nitrile (III) as follows

    D

By recycling the ketone resulting from reaction B or C and the nitrile resulting from reaction D, hydrazine hydrate is produced with only ammonia and hydrogen peroxide (and in the case of hydrazine salt, the acid HX) being consumed as is evident from the following equation which combines equations A, B and D.

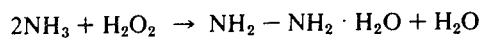

It has been found moreover, that without deviating from the process of this invention one need not treat part or all of the fraction containing the carboxylic amide in view of separating the latter; it is sufficient in such a case to add to the first step of the reaction an amount of nitrile corresponding to the carboxylic amide withdrawn.

Some examples of ketones conforming to formula (I) wherein $R_1$ and $R_2$ each is a straight or branched chain alkyl radical or cycloalkyl radical containing up to about 10 carbon atoms which can be advantageously employed in the process of this invention include acetone, 2-butanone, 2-pentanone, 3-pentanone, methylisopropylketone, methylisobutylketone and methylcyclohexylketone. Examples of ketones wherein $R_1$ and/or $R_2$ is an unsubstituted phenyl radical or a phenyl radical substituted with one or more radicals which are stable in the reaction medium include acetophenone, and benzophenone. Ketones of formula (I) in which $R_1$ and $R_2$ together is a straight or branched chain alkylene radical containing from 3 to about 11 carbon atoms which are useful in the process of this invention include, cyclobutanone, cyclopentanone, cyclohexanone, 2-methylcyclohexanone, 4-methylcyclohexanone, 2,4-dimethylcyclohexanone, 3,3,5-trimethylcyclohexanone, cycloheptanone, cyclooctanone and cyclodecanone. Because of the ease with which the lower alkyl ketones can be employed in this process as well as their economy, it is advantageous to utilize those ketones in which $R_1$ and $R_2$ each represent an alkyl radical of from 1 to 3 atoms of carbon. Acetone and methylethylketone have been found to be advantageous.

The radical $R_3$ of nitrile (II) can be an acyclic or cyclic radical containing less than 8 carbon atoms, an unsubstituted phenyl radical or a phenyl radical substituted with one or more radicals which are stable in the reaction medium as for example, methyl, methoxy, chloro, bromo, fluoro and nitro radicals.

8 Examples of useful nitriles wherein the radical $R_3$ is an acyclic or cyclic radical containing less than 8 carbon atoms include acetonitrile, propionitrile, butyronitrile, isobutyronitrile and cyclohexylcarboxylic nitrile. Examples of useful formula (II) nitriles wherein $R_3$ is an unsubstituted phenyl radical or a phenyl radical substituted with oen or more radicals which are stable in the reaction medium include, benzonitrile, ortho-, meta, and paratoluenenitrile, paramethoxybenzonitrile, metachlorobenzonitrile and paranitrobenzonitrile. Because of their ready availability and economy, acetonitrile and benzonitrile are especially advantageous in the process of this invention.

To carry out the process of this invention, ammonia hydrogen peroxide, ketone and nitrile are si. 'ter neously reacted in the liquid phase at a temperature in the range of from 0° to about 100° C. The reaction may proceed under ambient pressure or at a pressure up to about 10 atmospheres if the latter pressure is necessary to keep the ammonia in solution in the reaction medium. This reaction can be conducted in the presence of water and if desired, a solvent can be added to the reaction mixture in order to facilitate homogenization of the mixture. It is advantageous to select the solvent from amongst the alkyl monoalcohols having from 1 to 4 carbon atoms, as for example, methanol, ethanol, n-propanol, isopropanol, n-butanol, sec-butanol, isobutanol and tert-butanol. The quantity of water and solvent present in the reaction medium is not critical. For example, up to 50 moles each of water and solvent per mole of hydrogen peroxide can be added to the reaction medium.

The reactants can be added in stoichiometric quantity or less than, or a molar excess of, one or more reactants may also be employed. For example, 0.5 to 10 moles of ketone and ammonia per mole of hydrogen peroxide may be reacted. The quantity of nitrile added is advantageously a molar quantity equal to or greater than that of the hydrogen peroxide and may be from 1 to about 10 moles per mole of hydrogen peroxide.

The reactants can be employed in their usual commercial form. Anhydrous or aqueous ammonia and 30–90 percent by weight aqueous solutions of hydrogen peroxide can be used. The water introduced into the reaction medium by way of these aqueous solutions can constitute a part or all of the water added to the system.

It is advantageous to add a stabilizer for hydrogen peroxide to the reaction medium, as for example, phosphoric acid, nitrilotriacetic acid, and ethylenediaminetetraacetic acid or the sodium salts of said acids, at a level of from about 0.01–1.0 percent by weight of the reaction ingredients. It is also advantageous to add a catalyst to the reaction medium, as for example, an ammonium or alkali metal salt, the alkali metal advantageously being lithium, sodium or potassium, or a hydracid or mineral oxyacid, an aromatic or aliphatic carboxylic acid and an alkyl acid or arylsulfonic acid having less than 20 carbon atoms the anions of said salts being stable under the oxidizing conditions of the reaction medium. Examples of ammonium or alkali metal salts advantageously employed in this process include the fluorides, chlorides, sulfates, nitrates, phosphates, pyrophosphates, borates, carbonates, formates, acetates, propionates, butyrates, isobutyrates, hexanoates, octanoates, dodecanoates, stearates, oxalates, succinates, glutarates, adipates, benzoates, phthalates, methanesulfonates, ehtanesulfonates, benzensulfonates and p-toluenesulfonates. These salts can be added to the reaction medium as such or in the case of the ammonium salts, can be formed in situ with ammonia present by adding to the medium the corresponding acid. The amount of salt which can be added is in the amount of from 0.01-2.0 percent by weight of the total reaction mixture.

It is advantageous to employ an ammonium salt of an acid corresponding to the nitrile utilized in the reaction since this ammonium salt can accompany the carboxylic amide during the dehydration of the latter (Equation D, supra) and itself result in the same nitrile by dehydration. This selection of reaction components permits one to avoid, for example, introducing into the conduit for recycled nitrile, small quantities of undesirable nitrile resulting from the dehydration of an ammonium salt with a carboxylic acid other than that corresponding to the desired nitrile.

The process of this invention is equally suitable for batch or continuous production methods.

After reaction A, supra, the ketazine and carboxylic amide are separated from the other ingredients, advantageously by fractional distillation, and subjected to further treatment.

An important economic advantage of the precess resides in the fact that it is not at all necessary to carry out an extended separation of the various components and that a relatively brief fractionation after reaction A is quite satisfactory. This fractionation can be carried out batch-wise or continuously by means of a series of rectification columns.

It is advantageous to prevent premature hydrolysis of the ketazine during the separation step by avoiding heating mixtures containing the ketazine at a high temperature for any considerable period. Satisfactory results can be attained by limiting the boiling points of the mixtures in the course of fractional distillation as to not exceed about 80°C by an appropriate adjustment of the pressure under which distillation is conducted. Higher temperatures, up to about 120°C or even higher, at appropriate distillation pressure can be tolerated by employing apparatus which permits a low residence time for the liquid therein, for example a falling film distillation unit. The working pressure can be easily calculated as a function of these considerations and the nature of the products to be distilled. As an example, the distillation of unreacted ammonia can be carried out at a pressure lying between the pressure of the reactor and about 400 mm Hg and the other components which must be distilled in order to separate ketazine from the mixture can be distilled at a pressure lying between atmospheric pressure and 1 mm Hg.

Hydrolysis can be carried out according to known and conventional processes, either by a strong acid such as hydrochloric, sulfuric or phosphoric acid in aqueous solution to obtain the corresponding hydrazine salt as shown in equation C, supra, and the original ketone which is recycled, or by water as shown in equation B, supra, to yield free hydrazine in the form of its hydrate. Hydrolysis can be carried out at atmospheric pressure or at a pressure of up to 25 bars in a temperature range of from about 100° to 200°C within distillation apparatus fed with crude ketazine and water. The ketone to be recycled is withdrawn at the head of the distillation column and an aqueous solution of hydrazine hydrate is withdrawn at the base thereof.

The two types of hydrolysis can be combined if desired, so as to yield free hydrazine in aqueous solution and a hydrazine salt. It is advantageous in this case to partially hydrolyze the ketazine with water in a first apparatus, separating the hydrazine from the unreacted ketazine and the ketone liberated by the hydrolysis and then treating the remaining ketazine with a strong acid in aqueous solution to complete hydrolysis with the production of a corresponding quantity of hydrazine salt. This combination of the two methods of hydrolysis can be of interest in those situations where hydrazine is needed both in the form of the free base and as a salt and such a combination of methods leads to a reduction in the cost of the process.

It is known that while the acid hydrolysis of ketazines to form hydrazine salts can be readily carried out with quantitative results, the hydrolysis of ketazines with water to give good results is difficult when it involves obtaining total transformation in this manner because of the equilibrium nature of water hydrolysis reactions of ketazines. On the contrary, it is relatively easy to carry out partial hydrolysis of ketazines using water, at for example, a level of 20 to 70 percent and it is easy afterward, as well known, to hydrolyse the remaining ketone in an acid medium.

Dehydration of the carboxylic amide formed during the reaction can be conducted according to known and conventional methods which are described, for example in the text, "HOUBEN WEYL, METHODEN DER ORGANISCHEN CHEMIE, VOL. VIII, PART 3, page 330 et sequi., G. THIEME, STUTTGART (1952), 1952), by utilizing a chemical dehydrating agent such as phosphoric anhydride, phosphorous pentachloride, phosphorous oxychloride or thionyl chloride, and advantagesously, by conducting a thermal dehydration in the liquid or gaseous phase in the presence if desired, of a catalyst such as silica gel, alumina, pumice, thoria, boron phosphate, alumina impregnated with 5–30 percent phosphoric acid, within a temperature range of from 200°C to about 600°C. The dehydration reactor can be fed with crude carboxylic amide recovered at the foot of the column which distilled the ketazine, and containing in the appropriate case, unreacted nitrile but if desired, an intermediate purification step may be carried out either by distillation or crystallization.

The following examples are illustrative of the process of this invention.

EXAMPLE 1

A solution containing 20.5 gm (0.5 moles) acetonitrile, 58 gm (1.0 mole) acetone, 18 gm (1.0 mole) water, 1 gm of the disodium salt of ethylenediaminetetraacetic acid and 0.15 gm ammonium acetate in 160 gm (5 moles) of methanol was placed in a reactor equipped with a distillation column and gaseous ammonia was bubbled into this solution until 14.6 gm (0.86 moles) had become dissolved therein. The temperature of the reaction medium was raised to 50°C, and over a period of 5 minutes, 19.5 gm of an aqueous 70 percent by weight solution of $H_2O_2$ (0.4 moles) was added. The medium was left to react for 7 hours at this temperature while gaseous ammonia was bubbled therein at a rate of 1.7 gm (0.1 mole) per hour. Then the pressure was progressively reduced to 200 mm Hg to drive off the excess ammonia and at this pressure, the distillation of unreacted methanol, acetone and acetonitrile was carried out while maintaining a boiling temperature at the base of the column of about 50°C. There were thus recovered 173 gm of a distillate boiling at 40°C of which the composition by weight was as follows: 88.7 percent methanol, 8.4 percent acetone, 1.2 percent acetonitrile and 0.1 percent acetoneazine. The pressure was then reduced to 50 mm Hg and 76 gm of a 44.3 percent aqueous solution of acetoneazine, boiling at 35°C was recovered. 29.6 gm of a residue consisting of 88 percent by weight acetamide as well as acetoneazine and hydrazine, at a level of 4.7 percent of the total expressed as acetoneazine were recovered. The total quantity of acetoneazine formed during the reaction was 35.2 gm (0.314 moles) which corresponded to a yield of 78.5 percent by comparison to the $H_2O_2$ reacted.

20 gm water were added to 76 gm of the 44.3 percent aqueous solution of distilled acetoneazine (0.3 moles) and 57 gm of 66° Baume sulfuric acid (0.57 mole) were then progressively added. There resulted an immediate precipitation of hydrazine acid sulfate. The free acetone was distilled at atmospheric pressure and 32 gm (0.55 mole) of this ketone were recovered and recycled. The precipitated salt was filtered, washed with cold water and dried. 39 gm of hydrazine acid sulfate of 99.4 percent purity (0.3 mole) were recovered. The yield from hydrolysis was quantitative. The overall yield was 75 percent by comparison to the amount of $H_2O_2$ reacted.

EXAMPLE 2

The synthesis of acetoneazine was carried out continuously in a series of three reactors under a pressure of two bars. The residence time of the medium was 2 hours in each reactor and the temperature maintained in the first two reactors was 50°C while in the third reactor it was 60°C. All of the components were introduced into the first reactor and the mixture then was discharged therefrom by gravity. A vent disposed at the top of the condensor permitted maintenance of the pressure while allowing the gaseous products resulting from the reaction to escape. These products were for the most part oxygen and nitrogen formed by side reactions. The pressure of the mixture was then reduced to atmospheric pressure in a degasification column to eliminate unreacted $NH_3$ wherein the temperature of the liquid at the base of the column was maintained at 50°C. The mixture was then withdrawn into a second column operated at a pressure of 200 mm Hg with a distillation temperature at the head of the column of 40°C and the base of the column of 50°C and from which a mixture of methanol, acetone and acetonitrile were recovered and recycled. The product contained within the base of the column was fed into a third column operated at 50 mm Hg and with a distillation temperature at the head of 35°C and at the base of about 50°C and an aqueous solution of acetoneazine was distilled off leaving a residue principally containing acetamide. Vessels for storing the reactants, intermediates and end-products assured the constant operation of the apparatus.

The reactors were continuously fed with three streams of reactants: 30.2 gm/hr of an aqueous solution containing 45 percent by weight of $H_2O_2$ (0.4 moles), 2 percent disodium salt of ethylenediaminetetraacetic acid and 0.3 percent acetic acid, 24 gm/hr ammonia (1.4 moles) and 184 gm/hr of a mixture comprising 55.7 percent by weight of methanol (3.2 molees) 31.5 percent by weight of acetone (1.0 mole) and 11.1 percent by weight of acetonitrile (0.5 mole) made up of recycled ingredients with an amount of fresh ingredients added to compensate for the amounts lost. By evaporation, 12 gm/hr of ammonia (0.7 mole) were recovered, then with distillation of the light products, 130 gm/hr of a mixture of 76 percent by weight of methanol (3.1 moles), 14.3 percent by weight of acetone (0.32 moles), 4.4 percent by weight of acetonitrile (0.14 moles) and 0.1 percent acetoneazine were recovered and recycled. In the next column, 72.5 gm/hr of a 47 percent by weight aqueous solution of distilled acetoneazine were recovered and in the base of the column there remained a 23 gm residue containing 89 percent by weight acetamide (0.35 moles) and 4.2 percent by weight acetoneazine (0.009 moles).

Hydrolysis of the acetoneazine was carried out by water in a series of three columns. The column wherein hydrolysis was conducted was constructed of stainless steel, had a diameter of 15 mm and a height of 540 mm, was filled with stainless steel rings of 4 mm and was operated at a pressure of 5 bars with a temperature of 130°C at the head and 150°C at the base thereof. The column was fed at a level situated at three quarters of its height with a mixture containing 72.5 gm/hr of an aqueous solution of 47 percent acetoneazine (0.304 moles) coming from the distillation of the reaction mixture, 30 gm/hr of a 58 percent solution of acetoneazine (0.155 mole) recycled from the columns for separating the hydrolysis products and 105 gm/hr water. 53 gm/hr of a mixture rich in acetone containing 0.83 moles of acetone, 0.105 moles of hydrazine combined with part of the acetone in the form of an azine or diaziridine was taken off at the head of the column and 154.5 gm/hr of a hydrazine rich aqueous solution containing 0.342 moles of hydrazine and 0.73 moles of acetone combined with part of the hydrazine was contained at the base of the column. This aqueous solution was distilled in a second column at atmospheric pressure in order to eliminate the acetone present therin as acetoneazine which was distilled with water and recycled and there resulted 144.5 gm/hr of an aqueous solution of 10.1 percent by weight of pure hydrazine hydrate (0.292 moles). The mixture enriched in acetone was also rectified at atmospheric pressure whereby 34 gm/hr (0.58 moles) of acetone were recovered at the head of the column and recycled and the acetoneazine and water contained at the base of the column was recycled to the hydrolysis apparatus.

Crude acetamide was then continuously introduced in a vapor phase catalytic dehydration reactor comprising a U-shaped tube of stainless steel of 20 mm diameter and 500 mm length placed in a bath of fused salt and contained 85 cm$^3$ activated alumina spheres of 0.5 to 1 mm diameter ("alumina A" supplied by la Société péchiney) impregnated with 25 percent by weight of orthophosphoric acid. The acetamide was vaporised in a stream of 2.5 liters/hr of nitrogen at 450°C. 13.5 gm/hr of acetonitrile (0.33 moles) were recovered and recycled and corresponded to a total yield of acetamide of 94–95 percent.

Following is the number of moles of reactants consumed per mole of hydrazine hydrate produced:

| | |
|---|---|
| ammonia | 2.4 (83% yield) |
| hydrogen peroxide | 1.37 (73% yield) |
| acetone | 0.34 |
| acetonitrile | 0.10 |

In addition to their usefulness as reducing agents, and as chemical intermediate hydrazine hydrate and hydrazine salts are readily converted to hydrazine employing well known processes. For example, hydrazine is obtained from hydrazine hydrate by dehydration process or by extractive distillation with ethylene glycol. Hydrazine can be obtained from the salts thereof by the action of anhydrous ammonia.

WE CLAIM:
1. A method for the manufacture of hydrazine hydrate which comprises:
 a. reacting
  i. a ketone of the formula

$$R_1-CO-R_2 \qquad (I)$$

wherein the radicals $R_1$ and $R_2$ each is a straight or branched chain alkyl radical or cycloalkyl radical containing up to about 10 carbon atoms, an unsubstituted phenyl radical or a phenyl radical substituted with one or more radicals which are stable in the reaction medium or $R_1$ and $R_2$ together is a straight or branched chain alkylene radical containing from 3 to about 11 carbon atoms with
  ii. ammonia ($NH_3$),
  iii. hydrogen peroxide ($H_2O_2$), and
  iv. a nitrile of the formula $$R_3-CN \qquad (II)$$

wherein the radical $R_3$ is an acyclic or cyclic radical containing less than 8 carbon atoms, an unsubstituted phenyl radical or a phenyl radical substituted with one or more radicals which are stable in the reaction medium to produce
  v. a ketazine of the formula $$\begin{array}{c}R_1\\R_2\end{array}\!\!\!C=N-N=C\!\!\!\begin{array}{c}R_1\\R_2\end{array} \qquad (III)$$

and
  vi. a carboxylic amide of the formula:

$$R_3-CO-NH_2 \qquad (IV)$$

b. separating the ketazine (III) from the reaction medium; and
 c. reacting the ketazine (III) with water, or both to produce hydrazine hydrate and regenerate the starting ketone (I).

2. The process of claim 1 wherein the ketazine is separated from the reaction medium by fractional distillation.

3. The process of claim 2 wherein the fractional distillation is carried out below about 80°C.

4. The process of claim 2 wherein the carboxylic amide (IV) is dehydrated to regenerate the starting nitrile (II) and said nitrile is recycled.

5. The process of claim 4 wherein dehydration of the carboxylic amide (IV) is carried out in the vapor phase in the presence of a catalyst comprising alumina impregnated with from about 5 to 30 percent phosphoric acid.

6. The process of claim 5 wherein the regenerated ketone (I) is recycled.

7. The process according to claim 1 wherein 0.01 to 2.0 percent by weight of the total reaction mixture of a catalyst is added thereto, the catalyst selected to be an ammonium or alkali metal salt of a hydracid, mineral oxyacid, aliphatic or aromatic carboxylic acid or an alkyl or arylsulfonic acid having less than 20 carbon atoms.

8. The process of claim 7 wherein the catalyst is selected to be the ammonium salt of the acid corresponding to the nitrile (II) employed.

9. The process of claim 1 wherein the radicals $R_1$ and $R_2$ are each alkyl radicals having 1 to 3 carbon atoms.

10. The process of claim 9 wherein the radicals $R_1$ and $R_2$ are each a methyl radical.

11. The process of claim 10 wherein $R_3$ is a methyl radical.

12. The process of claim 1 wherein step (C) is carried out with water at a pressure of from 1 to about 25 bars and at a temperature of from about 100° to about 200°C to produce hydrazine hydrate.

13. The process of claim 1 wherein the hydrazine hydrate of step (C) is treated by an extractive distillation with ethylene glycol to produce hydrazine.

14. A method for the manufacture of hydrazine salts which comprises:
a. reacting
  i. a ketone of the formula

(I)

wherein the radicals $R_1$ and $R_2$ each is a straight or branched chain alkyl radical or cycloalkyl radical containing up to about 10 carbon atoms, an unsubstituted phenyl radical or a phenyl radical substituted with one or more radicals which are stable in the reaction medium or $R_1$ and $R_2$ together is a straight or branched chain alkylene radical containing from 3 to about 11 carbon atoms with
  ii. ammonia ($NH_3$)
  iii. hydrogen peroxide ($H_2O_2O$), and
  iv. a nitrile of the formula

(II)

wherein the radical $R_3$ is an acyclic or cyclic radical containing less than 8 carbon atoms, an unsubstituted phenyl radical or a phenyl radical substituted with one or more radicals which are stable in the reaction medium to produce
  v. a ketazine of the formula

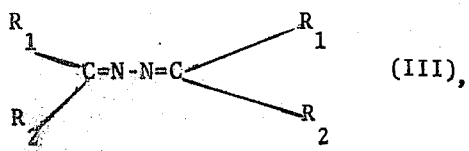

and
  vi. a carboxylic amide of the formula:

(IV)

b. separating the ketazine (III) from the reaction medium; and
c. reacting the ketazine (III) with a strong acid to produce a hydrazine salt and regenerate the starting ketone (I).

15. The process of claim 14 wherein step (c) is carried out with sulfuric acid to produce the acid salt of hydrazine.

16. The process of claim 14 wherein the hydrazine salt of step (c) is treated with anhydrous ammonia to produce hydrazine.

17. The process of claim 14 wherein the ketazine is separated from the reaction medium by fractional distillation.

18. The process of claim 17 wherein the fractional distillation is carried out below about 80°C.

19. The process of claim 17 wherein the carboxylic amide (IV) is dehydrated to regenerate the starting nitrile (II) and said nitrile is recycled.

20. The process of claim 19 wherein dehydration of the carboxylic amide (IV) is carried out in the vapor phase in the presence of a catalyst comprising alumina impregnated with from about 5 to 30 percent phosphoric acid.

21. The process of claim 20 wherein the regenerated ketone (I) is recycled.

22. The process according to claim 14 wherein 0.01 to 2.0 percent by weight of the total reaction mixture of a catalyst is added thereto, the catalyst selected to be an ammonium or alkali metal salt of a hydracid, mineral oxyacid, aliphatic or aromatic carboxylic acid or an alkyl or arylsulfonic acid having less than 20 carbon atoms.

23. The process of claim 22 wherein the catalyst is selected to be the ammonium salt of the acid corresponding to the nitrile (II) employed.

24. The process of claim 14 wherein the radicals $R_1$ and $R_2$ are each alkyl racicals having 1 to 3 carbon atoms.

25. The process of claim 24 wherein the radicals $R_1$ and $R_2$ are each a methyl radical.

26. The process of claim 25 wherein $R_3$ is a methyl radical.

27. The process of claim 25 wherein the acid of of step (c) is sulfuric acid.

28. A method for the manufacture of hydrazine hydrate and hydrazine salts which comprises:
a. reacting
  i. a ketone of the formula

(I)

wherein the radicals $R_1$ and $R_2$ each is a straight or branched chain alkyl radical or cycloalkyl radical containing up to about 10 carbon atoms, an unsubstituted phenyl radical or a phenyl radical substituted with one or more radicals which are stable in the reaction medium or $R_1$ and $R_2$ together is a straight or branched chain alkylene radical containing from 3 to about 11 carbon atoms with
  ii. ammonia ($NH_3$)
  iii. hydrogen peroxide ($H_2O_2$), and
  iv. a nitrile of the formula

(II)

wherein the radical $R_3$ is an acyclic or cyclic radical containing less than 8 carbon atoms, an unsubstituted phenyl radical or a phenyl radical substituted with one or more radicals which are stable in the reaction medium to produce
  v. a ketazine of the formula

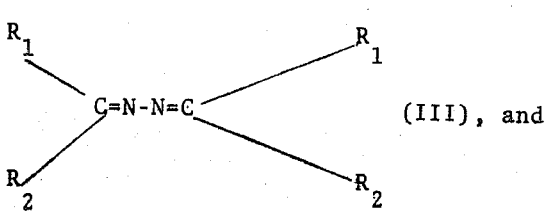

vi. a carboxylic amide of the formula

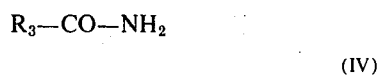

(IV)

b. separating the ketazine (III) from the reaction medium; and c. reacting the ketazine (III) with water and a strong acid to produce hydrazine hydrate and a hydrazine salt and regenerate the starting ketone(I).

29. The process of claim 28 wherein the hydrazine hydrate of step (c) is treated by an extractive distillation with ehtylene glycol to produce hydrazine.

30. The process of claim 28 wherein the hydrazine salt of step (c) is treated with anhydrous ammonia to produce hydrazine.

31. The process of claim 28 wherein the ketazine is separated from the reaction medium by fractional distillation.

32. The process of claim 31 wherein the fractional distillation is carried out below about 80°C.

33. The process of claim 31 wherein the carboxylic amide (IV) is dehydrated to regenerate the starting nitrile (II) and said nitrile is recycled.

34. The process of claim 33 wherein dehydration of the carboxylic amide (IV) is carried out in the vapor phase in the presence of a catalyst comprising alumina impregnated with from about 5 to 30 percent phosphoric acid.

35. The process of claim 34 wherein the regenerated ketone (I) is recycled.

36. The process according to claim 28 wherein 0.01 to 2.0 percent by weight of the total reaction mixture of a catalyst is added thereto, the catalyst selected to be an ammonium or alkali metal salt of a hydracid, mineral oxyacid, aliphatic or aromatic carboxylic acid or an alkyl or arylsulfonic acid having less than 20 carbon atoms.

37. The process of claim 36 wherein the catalyst is selected to be the ammonium salt of the acid corresponding to the nitrile (II) employed.

38. The process of claim 28 wherein the radicals $R_1$ and $R_2$ are each alkyl radicals having 1 to 3 carbon atoms.

39. The process of claim 38 wherein the radicals $R_1$ and $R_2$ are each a methyl radical.

40. The process of claim 39 wherein $R_3$ is a methyl radical.

41. The process of claim 28 wherein step(c) is carried out by:
1. hydrolyzing the ketazine (III) with about 20-70% of the water necessary for complete hydrolysis at a pressure of from 1 to about 25 bars and at a temperature of from about 100°C to about 200°C to partially hydrolyze the ketazine (III) to produce a mixture of hydrazine hydrate, a ketone and unreacted ketazine III;
2. separating the hydrazine hydrate and the ketone produced in (1) from the reaction mixture; and
3. treating the remaining unreacted ketazine (III) with a strong acid in aqueous solution to produce the acid salt of hydrazine.

* * * * *

UNITED STATES PATENT AND TRADEMARK OFFICE
CERTIFICATE OF CORRECTION

PATENT NO. : 3,869,541
DATED : March 4, 1975
INVENTOR(S) : Francis Weiss et al.

It is certified that error appears in the above-identified patent and that said Letters Patent are hereby corrected as shown below:

Column 1, lines 9-10 "$R_1R_2-C=\lambda N-N=C-R_1R_2$" should read

-- $R_1R_2-C=N-N=C-R_1R_2$ --.

Column 4, line 30, delete "8".

Column 4, line 45, "oen" should read --one--.

Column 4, line 54 "are si" should read -- are simultaneously--.

Column 5, line 39, "ehtanesulfonates" should read --ethanesulfonates--.

Column 9, line 28 "péchiney" should read --Pechiney--.

Signed and Sealed this twenty-fifth Day of May 1976

[SEAL]

Attest:

RUTH C. MASON
Attesting Officer

C. MARSHALL DANN
Commissioner of Patents and Trademarks